(12) United States Patent
Usami et al.

(10) Patent No.: US 8,464,817 B2
(45) Date of Patent: Jun. 18, 2013

(54) BATTERY MOUNTING STRUCTURE OF ELECTROMOTIVE VEHICLE

(75) Inventors: Ikuo Usami, Hiroshima (JP); Hirokazu Kita, Hiroshima (JP); Hiroyuki Nomura, Hiroshima (JP); Seiji Sadahira, Hiroshima (JP)

(73) Assignee: Mazda Motor Corporation (JP)

( * ) Notice: Subject to any disclaimer, the term of this patent is extended or adjusted under 35 U.S.C. 154(b) by 214 days.

(21) Appl. No.: 13/116,814

(22) Filed: May 26, 2011

(65) Prior Publication Data
US 2011/0297469 A1 Dec. 8, 2011

(30) Foreign Application Priority Data

Jun. 2, 2010 (JP) ................................. 2010-126568
Jun. 2, 2010 (JP) ................................. 2010-126570

(51) Int. Cl.
*B60K 1/04* (2006.01)
(52) U.S. Cl.
USPC ........................... 180/68.5; 429/100; 429/186
(58) Field of Classification Search
USPC .................. 180/68.5, 291; 429/99, 149, 151, 429/156, 100, 186, 163; 29/623.1
See application file for complete search history.

(56) References Cited

U.S. PATENT DOCUMENTS

| | | | |
|---|---|---|---|
| 6,632,560 B1 * | 10/2003 | Zhou et al. ...................... | 429/99 |
| 8,006,793 B2 * | 8/2011 | Heichal et al. ............... | 180/68.5 |
| 8,210,301 B2 * | 7/2012 | Hashimoto et al. .......... | 180/68.5 |
| 8,276,697 B2 * | 10/2012 | Takasaki ....................... | 180/68.5 |
| 2011/0024207 A1 | 2/2011 | Higashino et al. | |

FOREIGN PATENT DOCUMENTS

JP 2009-248708 A 10/2009

* cited by examiner

*Primary Examiner* — John Walters
*Assistant Examiner* — Brian Swenson
(74) *Attorney, Agent, or Firm* — Studebaker & Brackett PC

(57) ABSTRACT

Plural battery modules mounted on a first mount portion of a battery unit which is positioned below a front floor portion are arranged in a vehicle longitudinal direction such that the longitudinal direction of each of the battery modules matches a vehicle width direction and the short side of a rectangular section of each of the battery modules extends in a vehicle vertical direction, and plural battery modules mounted on a second mount portion which is positioned below a rear floor portion are arranged in the vehicle width direction such that the longitudinal direction of each of the battery modules matches the vehicle longitudinal direction and the long side of the rectangular section of each of the battery modules extends in the vehicle vertical direction. Accordingly, the plural battery modules can be arranged efficiently.

13 Claims, 12 Drawing Sheets

BATTERY MOUNTING STRUCTURE OF ELECTROMOTIVE VEHICLE

BACKGROUND OF THE INVENTION

The present invention relates to a battery mounting structure of an electromotive vehicle, in which plural battery modules having substantially the same shape are mounted below a vehicle floor as a unit.

In general, plural battery modules are mounted below a vehicle floor as a unit in an electromotive vehicle, such as an electric automotive vehicle. Japanese Patent Laid-Open Publication No. 2009-248708, for example, discloses a structure in which the plural battery modules are mounted in the almost whole area below the vehicle floor and on the rear suspension via the tray. In this structure, the plural rectangular-parallelepiped-shaped battery modules having the rectangular section along their longitudinal direction are arranged in both the vehicle longitudinal and width directions such that the longitudinal direction of each of the battery modules matches the vehicle longitudinal direction and the short side of the rectangular section of each of the battery modules extends in the vehicle vertical direction.

Herein, there is a case in which the vehicle floor comprises a front floor portion and a rear floor portion which is located above the front floor portion. In this case, generally, a rear seat is arranged on a rear floor portion, and a rear portion of the front floor portion is formed as a foot place for a passenger seated in the rear seat.

In the case of mounting the plural battery modules below the vehicle floor, the height of a space for mounting the battery modules located below the rear floor portion is greater than that of a space located below the front floor portion. Accordingly, the height of the battery modules mounted below the rear floor portion can be greater than that of the ones mounted below the front floor portion.

However, if the plural battery modules mounted on the vehicle have different shapes from each other, the manufacturing costs of the battery modules may increase, and the mount processes of the battery modules to the vehicle may deteriorate, thereby increasing the assembling costs as well.

Meanwhile, in case all of the battery modules having the same shape are arranged in the same direction like the structure disclosed in the above-described publication, the mount space of the battery modules below the rear floor portion may not be utilized properly.

Herein, while US Patent Application Publication No. 2011/0024207 discloses a cooling structure for the electromotive vehicle equipped with the battery modules, the above-described problem of the battery mount has not been solved by the structure disclosed in this patent document.

SUMMARY OF THE INVENTION

The present invention has been devised in view of the above-described matters, and an object of the present invention is to provide a battery mounting structure of an electromotive vehicle which can efficiently arrange the plural battery modules, thereby mount as many battery modules as possible.

According to the present invention, there is provided a battery mounting structure of an electromotive vehicle, comprising a vehicle floor comprising a front floor portion and a rear floor portion which is located above the front floor portion, and a battery unit comprising plural battery modules and a battery mount portion on which the plural battery modules are mounted, each of the plural battery modules having substantially the same flat shape having a rectangular section along a longitudinal direction thereof, the battery unit being mounted below the vehicle floor, wherein the battery mount portion of the battery unit comprises a first mount portion which is positioned below the front floor portion of the vehicle floor and a second mount portion which is continuous from the first mount portion and positioned below the rear floor portion of the vehicle floor, and the battery modules mounted on the first mount portion are arranged at least in a vehicle longitudinal direction such that the longitudinal direction of each of the battery modules matches a vehicle width direction and the short side of the rectangular section of each of the battery modules extends in the vehicle vertical direction, and the battery modules mounted on the second mount portion are arranged in the vehicle width direction such that the longitudinal direction of each of the battery modules matches the vehicle longitudinal direction and the long side of the rectangular section of each of the battery modules extends in the vehicle vertical direction.

According to the present invention, since the battery modules mounted on the first mount portion are arranged such that the short side of the rectangular section of each of the battery modules extends in the vehicle vertical direction, the battery modules can be properly mounted in the space below the front floor portion which has a relatively small height. Meanwhile, since the battery modules mounted on the second mount portion are arranged such that the long side of the rectangular section of each of the battery modules extends in the vehicle vertical direction, the battery modules can be properly mounted in the space below the rear floor portion by utilizing the relatively great height of this mount space. Further, since the battery modules mounted on the second mount portion are arranged such that the short side of the rectangular section of each of the battery modules extends in the vehicle width direction, more battery modules can be arranged in the vehicle width direction. Accordingly, the plural battery modules having the same shape can be efficiently arranged according to the height of the mount space of the battery modules, so that as many battery modules as possible can be amounted.

According to an embodiment of the present invention, the first mount portion is supported at a pair of front floor frames fixed to a lower face of the front floor portion, and the second mount portion is supported at a pair of rear side frames fixed to a lower face of the rear floor portion, the distance between the pair of rear side frames being greater than that between the pair of front floor frames. Thereby, the battery unit can be supported at the front floor frame and the rear side frame, so that the support of the battery unit can be improved.

According to another embodiment of the present invention, the first mount portion has an electric-component installment portion to install an electric component, and the maximum height of the electric component installed at the electric-component installment portion of the first mount portion is located below an upper face of the battery modules mounted on the first mount portion. Thereby, the electric component, such as the one for battery charge-discharge control, can be mounted together with the battery modules on the vehicle as a unit. Further, the arrangement of both the battery modules and the electric component can be efficient.

According to another embodiment of the present invention, a rear seat is arranged on the rear floor portion, a rear portion of the front floor portion is located below the level of a front portion of the front floor portion, and the electric-component installment portion of the first mount portion is positioned below the rear portion of the front floor portion. Thereby, the level of the foot place for the passenger seated in the rear seat can be made properly low, and the battery modules and the electric component can be arranged efficiently.

According to another embodiment of the present invention, the second mount portion includes a second support portion to support the plural battery modules, and the second support portion comprises a lower frame portion which includes a front portion to support lower portions of front end portions of the plural battery modules, a rear portion to support lower portions of rear end portions of the plural battery modules, and a pair of side portions to support lower portions of outside end portions of the two battery modules located on both side ends in the vehicle width direction, an upper frame portion which supports upper portions of rear end portions of the plural battery modules, a connection frame portion which connects the upper frame portion and a rear portion of the lower frame portion, and a slant frame portion which connects an upper portion of the connection portion or the upper frame portion and a front portion of the lower frame portion. Thereby, the plural battery modules can be securely supported by the second support portion at the second mount portion, and the second support portion can be prevented from deforming in the vehicle rear collision.

According to another embodiment of the present invention, the first mount portion includes a first support portion to support the plural battery modules, which includes a frame portion with a front portion, a rear portion, and a pair of side portions, a rear portion of the frame portion of the first support portion is connected to the front portion of the lower frame portion of the second support portion, the distance between the both side portions of the frame portion of the first support portion is smaller than that between the both side portions of the lower frame portion of the second support portion, the slant frame portion of the second support portion is comprised of plural portions which are arranged in the vehicle width direction with specified distances from each other, two of which are located at the same positions as the both side ends of the frame portion of the first support portion in the vehicle width direction. Thereby, the plural battery modules can be securely supported by the first support portion. Further, since the two slant frame portions of the second support portion are located at the same positions as the both side ends of the frame portion of the first support portion in the vehicle width direction, any deformation of the second support portion in the vehicle rear collision can be prevented effectively by using the first support portion.

According to another embodiment of the present invention, the second support portion further comprises a middle frame portion which connects the front portion and the rear portion of the lower frame portion at the same position as the slant portion in the vehicle width direction, and the slant portion is formed integrally with the middle frame portion which is positioned at the same position as the slant frame portion in the vehicle width direction. Thereby, any deformation of the second support portion in the vehicle rear collision can be prevented more effectively.

According to another embodiment of the present invention, each of the battery modules has a discharge port to discharge gas generating in the battery module to the outside, and part of the first and second mount portions is comprised of a hollow frame member, which has an inlet port to guide the gas discharged from the discharge port of the battery module thereinto and an outlet port to exhaust the gas guided thereinto through the inlet port to the outside of the battery unit. Thereby, the gas generating in the battery modules can be discharged to the outside of the battery unit by using the hollow frame member constituting part of the support member to support the battery modules. Further, since this hollow frame member can be generally arranged near all of the battery modules easily, the gas can be promptly discharged into the hollow frame member from the discharge port. Moreover, the flexibility of positioning the outlet port is so high that the gas can be exhausted to the outside of the battery unit from an appropriate position. The gas inside the hollow frame member can be cooled by the hollow frame member, and in particular, if the hollow frame member is configured such that part of the hollow frame member is exposed to the outside air, cooling of the gas inside the hollow frame member can be effective. Accordingly, the gas can be exhausted to the outside of the battery unit effectively without providing any particular gas exhaust pipe.

According to another embodiment of the present invention, the battery unit has an electric-component installment portion to install an electric component, the plural battery modules are arranged such that the electric-component installment portion is located between the battery modules in a plan view, the first and second mount portions respectively comprise first and second support portions to support the battery modules which are arranged away from each other, the first and second support portions are connected to each other such that the insides thereof connects to each other, and the outlet port is formed at either the first support portion or the second support portion to be common to the both. Thereby, the electric component installed on the electric-component installment portion may not be damaged by the gas generating inside the battery module, so that the electric component, such as the one for battery charge-discharge control, can be mounted together with the battery modules on the vehicle as a unit.

According to another embodiment of the present invention, the first mount portion includes a frame portion which has a continuously-connected inside over an entire periphery thereof, and the outlet port is located at another frame portion which constitutes part of the second mount portion. Thereby, the gas can be cooled properly, flowing down in the frame portion, and guided to the outlet port.

According to another embodiment of the present invention, each of the battery modules comprises a module body, an exhaust port which is provided at the module body to exhaust the gas generating in the module body to the outside of the module body, and a gas guide member which is provided at an outside face of the module body, has the discharge port, and guides the gas exhausted from the exhaust port to the discharge port, each of the module bodies of the plural battery modules has the same shape in which the gas guide member is provided at the same face, the plural battery modules are included in either one of first and second battery module groups in which manners of arrangement of the battery modules are different from each other, each of the gas guide members of the battery modules of the first and second battery module groups has substantially the same shape except the discharge port and the vicinity of the discharge port, the discharge port of each of the gas guide members of the battery modules of the first and second battery module groups is formed at a specified portion so as to correspond to the manners of arrangement of the battery modules, and the inlet port is formed at a position facing the discharge port such that the inlet port connects to the discharge port. Thereby, the gas generating inside the battery modules can be guided to the frame member easily only by changing part of the gas guide member (the discharge port and its vicinity) in accordance with the arrangement manner of the battery modules of the first and second battery module groups.

According to another embodiment of the present invention, part of an outside face of a frame member which constitutes part of the first and second mount portions is exposed to the outside air. Thereby, the gas inside the frame member can be cooled effectively, so that the damage which may be caused by the high gas temperature can be decreased as much as possible.

According to another embodiment of the present invention, the battery unit comprises a cooling structure in which the outside air is taken in inside the battery unit and discharges the taken-in outside air to the outside through a space between the battery modules and a cover member enclosing the battery modules. That is, the battery modules may be cooled effectively by the cooling air of the cooling structure in a normal state, but if the gas generating inside part of the battery modules mixed with the cooling air, the gas might be heated by the gas and thereby the other battery modules located downstream of the part of the battery modules in which the gas generated might be damaged improperly. According to the present embodiment, however, the gas generating inside the battery modules is guided into the hollow frame member through the discharge ports of the battery modules and the inlet portion of the hollow frame member, so that the gas does not mix with the cooling air. Thereby, the damage of the battery modules which may be caused by the gas can be decreased properly.

Other features, aspects, and advantages of the present invention will become apparent from the following description which refers to the accompanying drawings.

DETAILED DESCRIPTION OF THE INVENTION

Hereafter, a preferred embodiment of the present invention will be descried.

Figure 1:
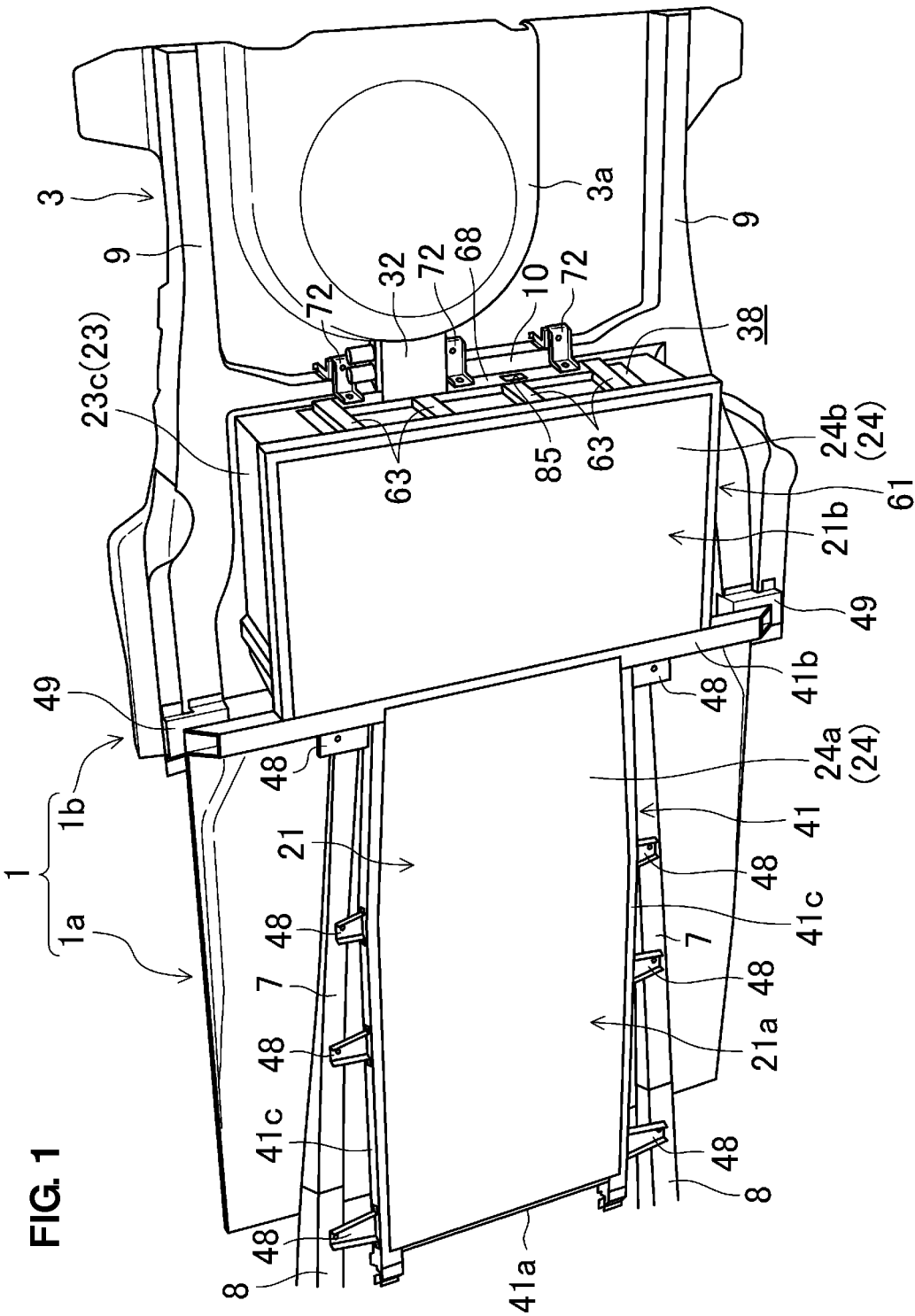
FIG. 1 is a perspective view showing a lower-side structure of a vehicle floor of an electromotive vehicle which is equipped with a battery mount structure according to an embodiment of the present invention, when viewed from obliquely below.
Figure 2:
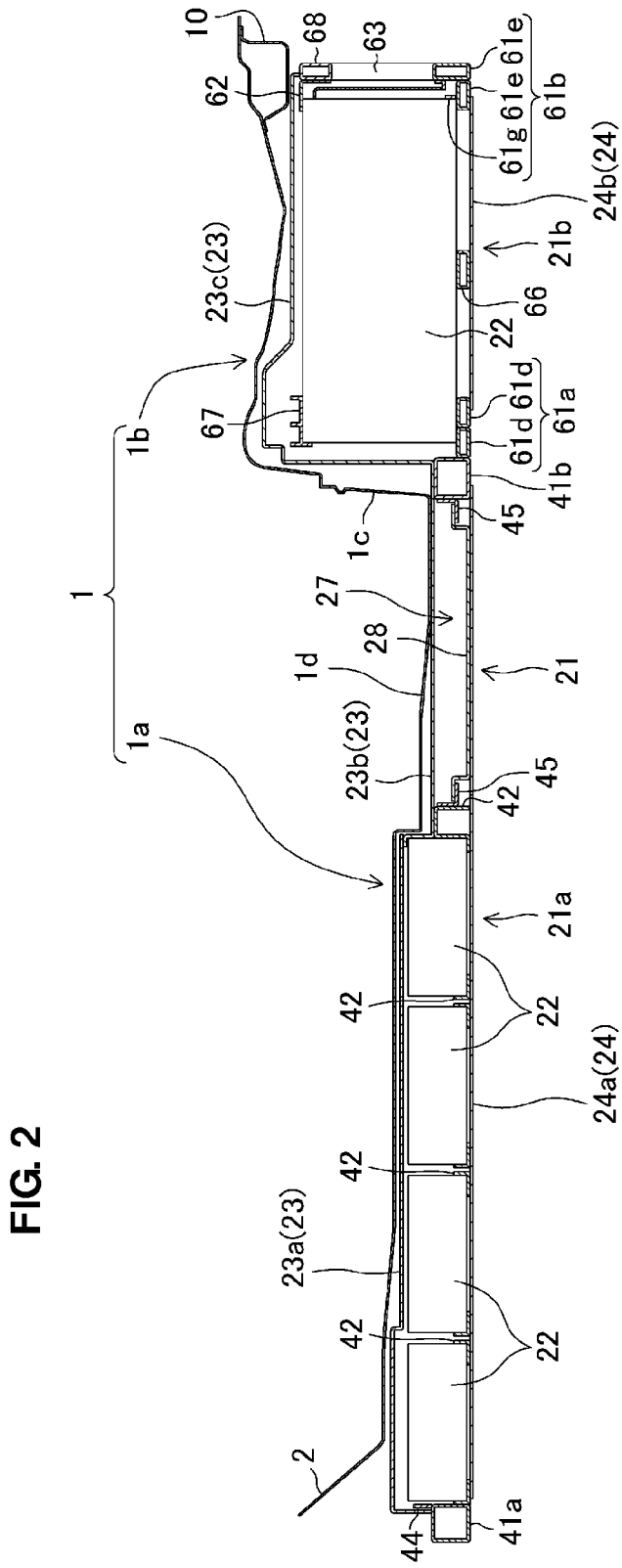
FIG. 2 is a sectional view taken along a vehicle longitudinal direction, showing the lower-side structure of the vehicle floor of the vehicle (a sectional view when viewed from a vehicle side).

FIGS. 1 and 2 show a lower-side vehicle floor 1 of an electromotive vehicle (an electric vehicle in the present embodiment) which is equipped with a battery mount structure according to the present embodiment of the present invention. Herein, the front, rear, left, right, above, or below with respect to a vehicle will be simply referred to as the "front" "rear" "left" "right" "above" or "below."

The vehicle floor 1 comprises a front floor portion 1a and a rear floor portion 1b which is located above the level of the front floor portion 1a. That is, a kick-up portion 1c is formed between the front floor portion 1a and the rear floor portion 1b, and the level of the rear floor portion 1b is higher than the front floor portion 1a by the height of this kick-up portion 1c.

A rear seat (not illustrated) is arranged on the rear floor portion 1b. A foot place 1d for a passenger seated in the rear seat is provided by a rear portion of the front floor portion 1a which is located below the level of a front portion of the front floor portion 1a. A driver's seat and a passenger's seat (an assistant's seat), not illustrated, are arranged side by side on the front portion of the front floor portion 1a.

A front end portion of the front floor portion 1a is connected to a lower end portion of a dash panel 2. Both side end portions of the front floor portion 1a are connected to a pair side sills (not illustrated) which extends in a vehicle longitudinal direction (longitudinally).

A pair of front floor frames 7 which extends in the vehicle longitudinal direction is provided at a lower face of the front floor portion 1a at a position which is located slightly inward from the side end portion of the front floor portion 1a. Each of the front floor frames 7 extends rearward and slants slightly inward. That is, the distance between the pair of front floor frames 7 becomes narrower toward the rear. Front end portions of the right and left front floor frames 7 are connected to rear end portions of right and left front side frames 8, respectively.

A rear end portion of the rear floor portion 1b connects to a front end portion of a baggage floor 3. A spare tire pan 3a is formed at the baggage floor 3 to project downward. A pair of rear side frames 9 which extends in the vehicle longitudinal direction is provided at respective lower faces of the rear floor portion 1b and the baggage floor 3 at their both side end portions. Front end portions of the right and left rear side frames 9 are connected to rear end portions of right and left side sills. At a rear end portion of a lower face of the rear floor portion 1b is provided a cross member 10 which interconnects the rear side frames 9 in a vehicle width direction. The distance between the right and left rear side frames 9 is greater than that between the right and left front floor frames 7.

Figure 3:
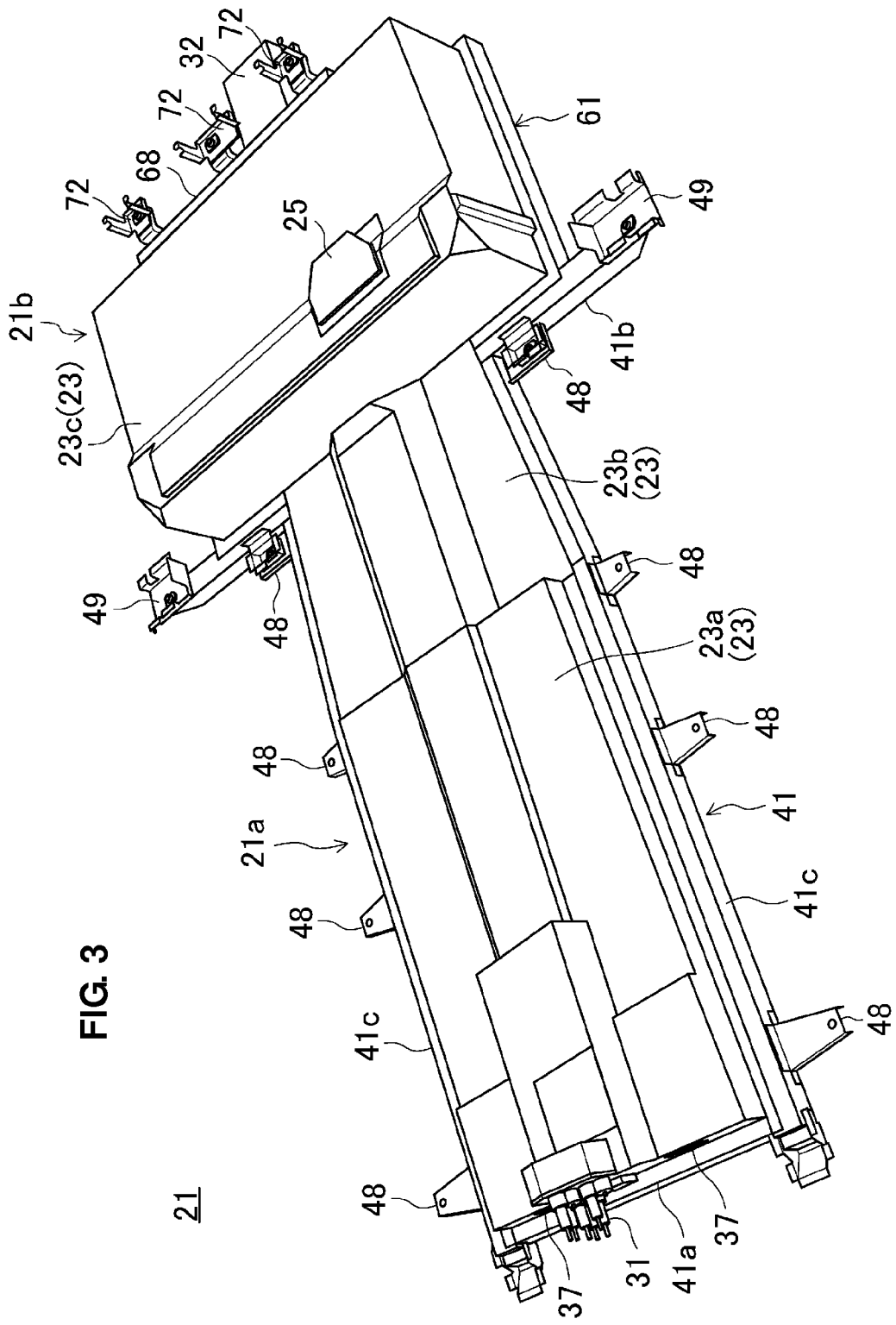
FIG. 3 is a perspective view showing a battery unit.

FIG. 3 shows a battery unit 21 which is mounted below the vehicle floor 1. This battery unit 21 comprises plural (fourteen in the present embodiment) battery modules 22 (see FIG. 4), a frame member 40 as a support member to support the plural battery modules 22 (see FIG. 5), and an upper cover member 23 and a lower cover member 24. That is, the plural battery modules 22 are mounted below the vehicle floor 1 as a unit. The battery unit 21 comprises a first mount portion 21a which is positioned below the front floor portion 1a and a second mount portion 21b which is continuous from the first mount portion 21a and positioned below the rear floor portion 1b as a mount portion to mount the plural battery modules 22.

Hereafter, the front, rear, left, right, above, or below with respect to the battery unit 21 means the "front" "rear" "left" "right" "above" or "below" in a state where the battery unit 21 is mounted on the vehicle, which is the same as the above-described "front" "rear" "left" "right" "above" or "lower" with respect to the vehicle.

The above-described upper and lower cover members 23, 24 enclose the plural battery modules 22. That is, a space for storing the battery modules 22 and the frame member 40 is formed between the upper and lower cover members 23, 24. Herein, part of the frame member 40 projects outside through a space between the peripheral portion of the upper cover member 23 and the peripheral portion of the lower cover member 24, so that part of the outside face of the frame member is exposed to the outside air.

Further, the battery unit 21 comprises a cooling structure in which the outside air is taken in inside the battery unit 21 (the space storing the battery modules 22) and discharges the taken-in outside air to the outside through a space between the battery modules 22 and the upper and lower cover members 23, 24. That is, the battery unit 21 has an air inlet port 37 to take in the air (outside air) inside the battery unit 21, an air outlet port 38 to exhaust the taken-in air, and a fan (not illustrated) to conduct the air's taking in or exhaustion. The air inlet port 37 and the air outlet port 38 are formed at a front end portion and a rear end portion of the upper cover member 23, respectively, and the fan is provided near the air outlet port 38. The air (outside air) is taken in from the air inlet port 37 by the operation of the fan, and this air flows down rearward through the space between the battery modules 22 and the upper and lower cover members 23, 24 inside the battery unit 21, then gets out of the air inlet port 38. Thereby, the inside of the battery unit 21 (the battery modules 22) is cooled.

The upper cover member 23 comprises a first portion 23a, a second portion 23b, and a third portion 23c, from the front. The first portion 23a and the second portion 23b are positioned at the first mount portion 21a, and the third portion 23c is positioned at the second mount portion 21b. The first portion 23a is located above the four battery modules 22 on the first mount portion 21a, and the second portion 23b is located above an electric-component installment portion 27 which will be described below. The upper face of the third portion 23c is positioned above the level of the upper faces of the first portion 23a and the second portion 23b according to the height position of the front floor portion 1a and the rear floor portion 1b. Further, the lower cover member 24 comprises a first portion 24a and a second portion 24b, and the first portion 24a is located at the first mount portion 21a and the second portion 24b is located at the second mount portion 21b. The lower faces of the first portion 24a and the second portion 24b of the lower cover member 24 are located at the same level.

A cover 25 is provided at the upper face of the third portion 23c of the upper cover member 23. The cover 25 covers a plug hole (not illustrated) which is provided at the upper face of the third portion 23c to plug a safety plug, not illustrated, into a plug receiver 35 (see FIG. 4). This safety plug is provided to shut down part of a high voltage circuit from the safety stand point when the battery unit 21 is manufactured. The part of this circuit which has been shut down is connected by plugging the safety plug into the plug receiver 35. Before the battery unit 21 is installed, the cover 25 is not attached and the plug hole is open. Then, after the battery unit 21 is mounted below the vehicle floor 1, the safety plug is plugged into the plug receiver 35 from the vehicle inside. That is, a service hole is formed at the rear floor portion 1b below the rear seat, the safety plug is plugged into the plug receiver 35 via the service hole and the plug hole, and then the plug hole is covered with the cover 25.

At the front end portion of the battery unit 21 is arranged an inverter-connection terminal 31 which electrically couples the battery unit 21 to an inverter which is provided between the battery unit 21 and a drive motor of the vehicle. The inverter-connection terminal 31 is supported at an inverter-connection terminal support portion 44 which is provided at a front portion 41a of a frame portion 41 of a first support portion 40a, which will be described below, of the frame member 40. Meanwhile, at the rear end portion of the battery unit 21 is arranged an electric-power input terminal 32 which electrically couples the battery unit 21 to an input terminal which is provided at the outer face of the vehicle and connected to an outside electricity source when the battery modules 22 are charged. The electric-power input terminal 32 is supported at a reinforcement frame portion 68 (electric-power input terminal support portion 73) of a second support portion 40b, which will be described below, of the frame member 40.

Figure 4:
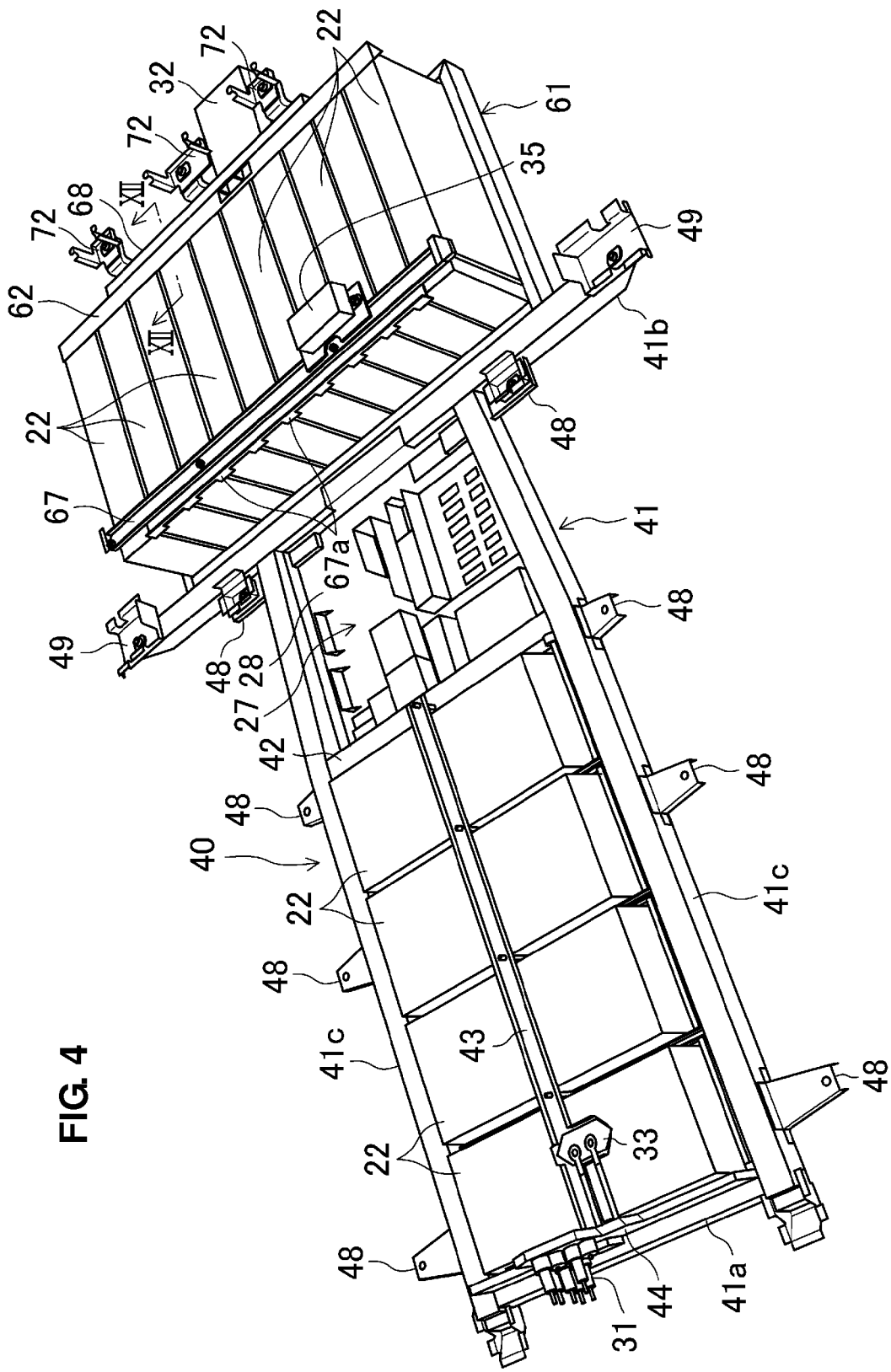
FIG. 4 is a perspective view showing a state in which upper and lower cover members of the battery unit are removed.

As shown in FIG. 4, each of the plural battery modules 22 of the battery unit 21 has substantially the same flat shape having a rectangular section along its longitudinal direction (except a gas guide member 22c, which will be described later). That is, the battery module 22 is substantially of a rectangular parallelepiped shape. The battery module 22 stores plural (hundreds) cylindrical cells in it. With respect to the battery module 22, the direction in which the long side of the above-described rectangular section extends will be referred to as the width direction, and the direction in which the short side of the rectangular section extends will be referred to as the thickness direction (the same for a module body, which will be described later).

Figure 8:
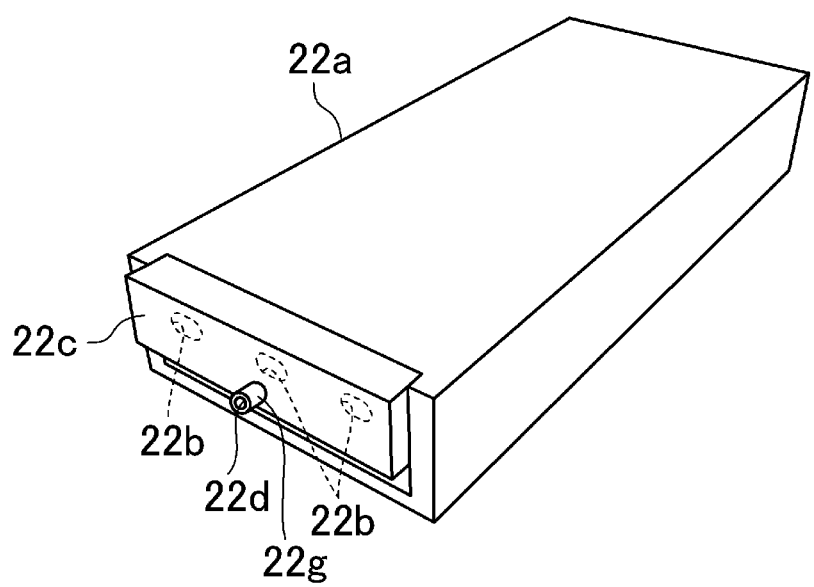
FIG. 8 is a perspective view showing a battery module at a first mount portion (a first battery module group) of the battery unit.
Figure 11:
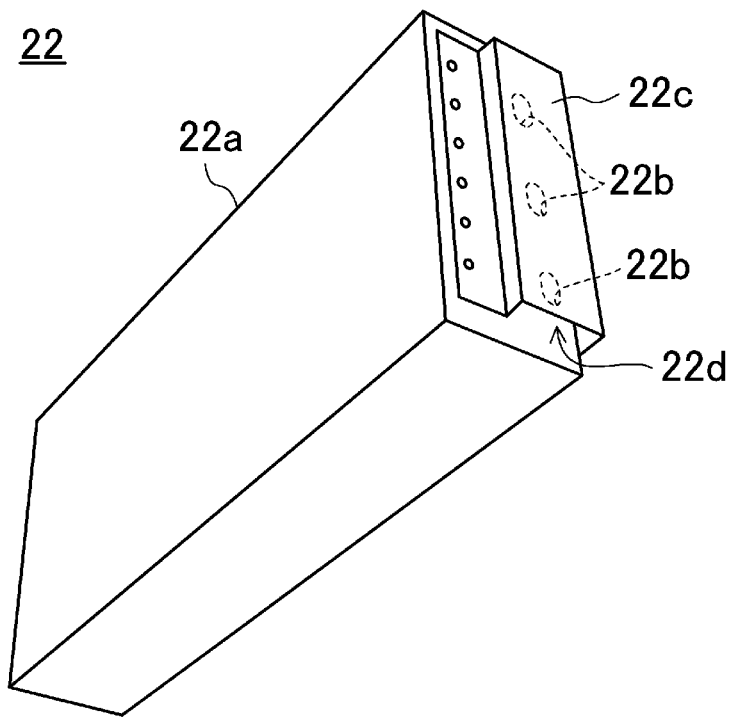
FIG. 11 is a perspective view showing the battery module of a second mount portion (a second battery module group) of the battery unit.

As shown in FIGS. 8 and 11, the battery module 22 has a discharge port 22d to discharge gas generating in the battery module 22 to the outside of the battery module 22 (gas having a high temperature of about 500° and generating in an abnormal state of the battery module 22, such as carbon monoxide or hydrogen). Specifically, each of the battery modules 22 comprises the module body 22a, exhaust ports 22b which are formed at the outside face of the module body 22a and exhausts the gas generating in the module body 22a to the outside of the module body 22a, and the gas guide member 22c which is provided at the outside face of the module body 22a (at a one-end face in its longitudinal direction), has the above-described discharge port 22d, and guides the gas exhausted from the exhaust ports 22b to the discharge port 22d. Each of the module bodies 22a of the plural battery modules 22 has the same face (a one-end face in the longitudinal direction of the module body 22a) in which the above-described gas guide member 22c is provided at the same face.

FIG. 8 shows the battery module 22 to be mounted on the first mount portion 21a. The battery modules 22 mounted on the first mount portion 21a (the four battery modules in the present embodiment) are arranged in the vehicle longitudinal direction such that the longitudinal direction of each of the battery modules 22 matches the vehicle width direction and the short side of the rectangular section of each of the battery modules 22 extends in the vehicle vertical direction (such that the thickness direction of each of the battery modules 22 matches the vehicle vertical direction and the width direction of each of the battery modules 22 matches the vehicle longitudinal direction). That is, the battery module 22 on the first mount portion 21a is placed laterally relative to the frame member 40 such that its rectangular section is laterally long.

Figure 9:
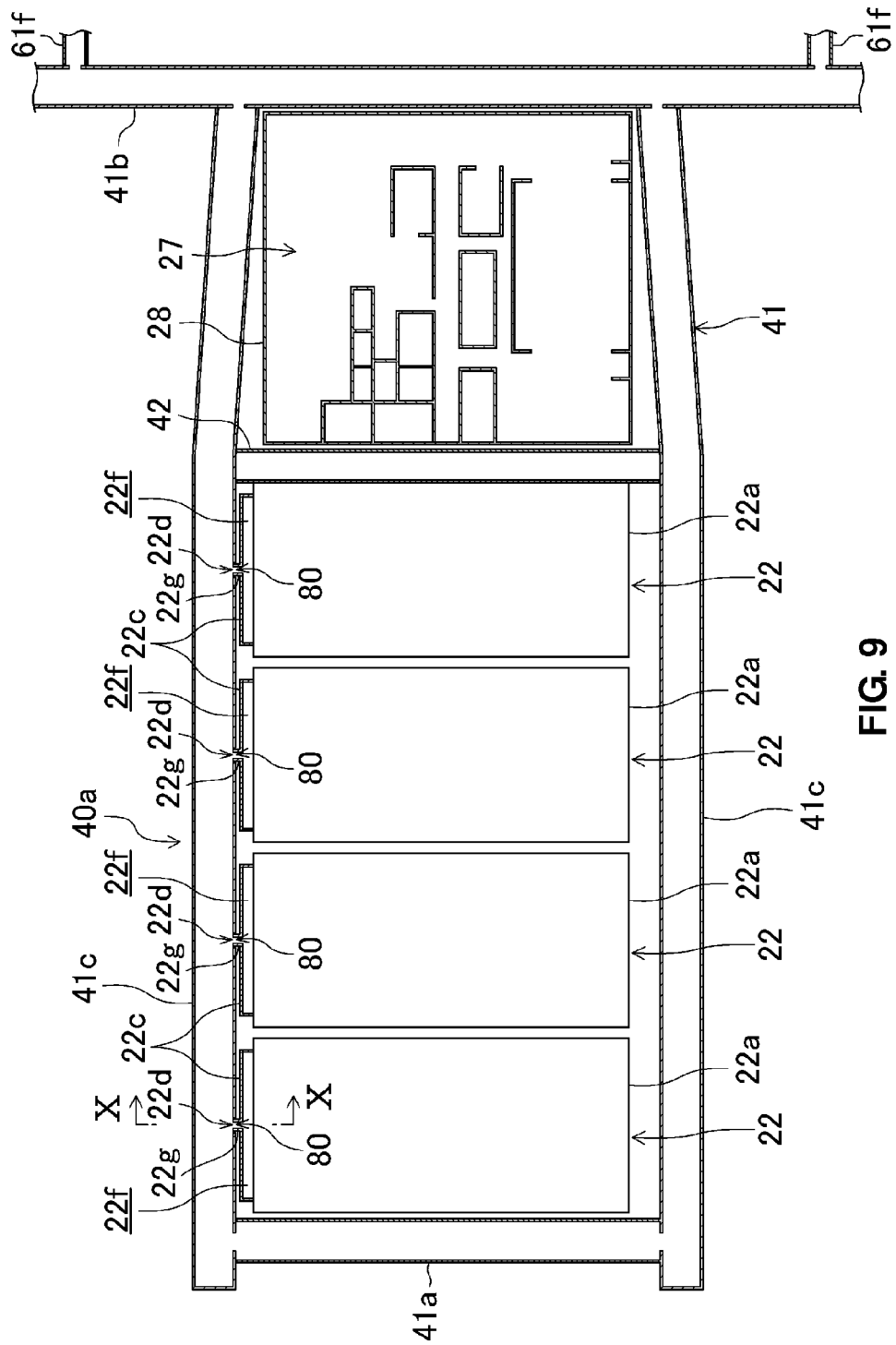
FIG. 9 is a sectional view of the first mount portion of the battery unit, taken along a horizontal direction at the level of a frame portion of the frame member (a sectional view when viewed from above).
Figure 10:
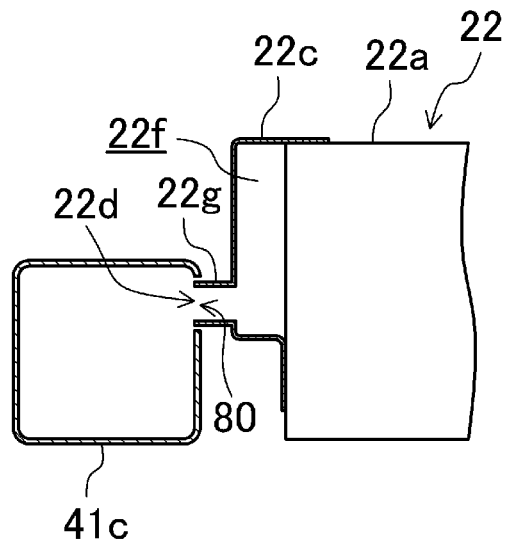
FIG. 10 is a sectional view taken along line X-X of FIG. 9.

The guide member 22c of the battery module 22 on the first mount portion 21a extends in the vehicle longitudinal direction so as to cover the exhaust ports 22b formed at the upper portion of the end face of the one side in the longitudinal direction of the module body 22a (the end face facing the vehicle right). As shown in FIGS. 9 and 10, a gas guide passage 22f is formed between the gas guide member 22c and the end face of the module body 22a. The gas guide member 22c contacts the module body 22a at its entire periphery to seal for no leak of gas. A projection portion 22g is formed at a lower portion (located near a right side portion 41c of the frame portion 41, which will be described later) of the face of the gas guide member 22c which faces the vehicle right. A tip portion of this projection portion 22g has the above-described discharge port 22d which connects to the above-described gas guide passage 22f. Herein, the gas guide passage 22f is formed at an upper position of the one-end face in the longitudinal direction of the module body 22a which corresponds to the exhaust ports 22b. The exhaust ports 22b are formed on the side where the much gas generates easily in the cells of the module body 22a.

Meanwhile, FIG. 11 shows the battery module 22 to be mounted on the second mount portion 21b. The battery modules 22 mounted on the second mount portion 21b (the ten battery modules in the present embodiment) are arranged in the vehicle width direction such that the longitudinal direction of each of the battery modules 22 matches the vehicle longitudinal direction and the short side of the rectangular section of each of the battery modules 22 extends in the vehicle longitudinal direction (such that the width direction of each of the battery modules 22 matches the vehicle vertical direction and the thickness direction of each of the battery modules 22 matches the vehicle width direction). That is, the battery module 22 on the second mount portion 21b is placed longitudinally relative to the frame member 40 such that its rectangular section is longitudinally long. As described above, the manners of arrangement of the battery modules 22 relative to the frame member 40 are different from each other between the first mount portion 21a and the second mount portion 21b. The battery module group including the four battery modules 22 on the first mount portion 21a corresponds to the first battery module group of the present invention, the battery module group including the ten battery modules 22 on the second mount portion 21b corresponds to the second battery module group of the present invention.

Figure 12:
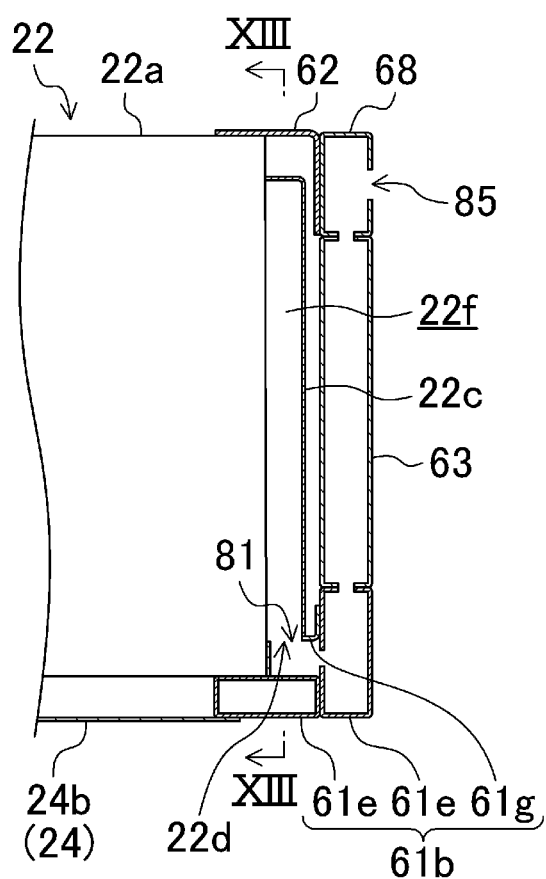
FIG. 12 is a sectional view taken along line XII-XII of FIG. 4.

The gas guide member 22c of the battery module 22 on the second mount portion 21a extends vertically so as to cover the exhaust ports 22b located at the end face (facing to the vehicle rear) of the module body 22a on the left and right portions. As shown in FIG. 12, the gas guide passage 22f is formed between the gas guide member 22c and the end face of the module body 22a. The periphery of the gas guide member 22c contacts the module body 22a except its lower portion. At a lower end portion (a specified portion near a member 61g of a rear portion 61b of a lower frame portion 61, which will be described later) of the gas guide member 22c is formed the above-described discharge port 22d to connect to the gas guide passage 22f. The gas guide member 22c of the batter module 22 on the second mount portion 21b does not have any projection portion in it like the projection portion 22g provided in the gas guide member 22c of the batter module 22 on the first mount portion 21a. Herein, the gas guide passage 22f is formed at the left position or the right position of the end face of the one end of the module body 22a in the longitudinal direction.

The gas guide members 22c of the battery modules 22 of the first and second mount portions 21a, 21b (the battery modules 22 of the first and second battery module groups) have almost the same shape except the above-described discharge port 22d and its vicinity. That is, the positions of the discharge ports 22d of the gas guide members 22c of the battery modules 22 of the first and second mount portions 21a, 21b are different from each other. The respective discharge ports 22d are formed at respective positions near the frame member 40 at the gas guide member 22c, which correspond to the manners of arrangement of the battery modules 22. Accordingly, the positions of the discharge ports 22d are different from each other.

The first mount portion 21a has an electric-component installment portion 27 to install electric components (not illustrated) relating to a battery charge-discharge control, such as IC, resister or relay. This electric-component installment portion 27 of the first mount portion 21a of the battery unit 21 is located below a rear portion (the foot place 1d of the passenger seated in the rear seat) of the front floor portion 1a. The above-described four battery modules 22 are arranged on the first mount portion at a specified position below the front portion of the front floor portion 1a (in front of the electric-component installment portion 27).

The electric-component installment portion 27 includes a tray 28 which forms its upper face having a shape corresponding to the shape of the electric component. The electric-component installment portion 27 is installed on the tray 28. The maximum height of the electric component installed on the tray 28 of the electric-component installment portion 27 of the first mount portion 21a of the battery unit 21 is located below the upper face of the battery modules 22 mounted on the first mount portion 21a. Accordingly, as described above, the rear portion (the foot place 1d for the passenger seated in the rear seat) of the front floor portion 1a is located at a level below the front portion of the front floor portion 1a.

Figure 5:
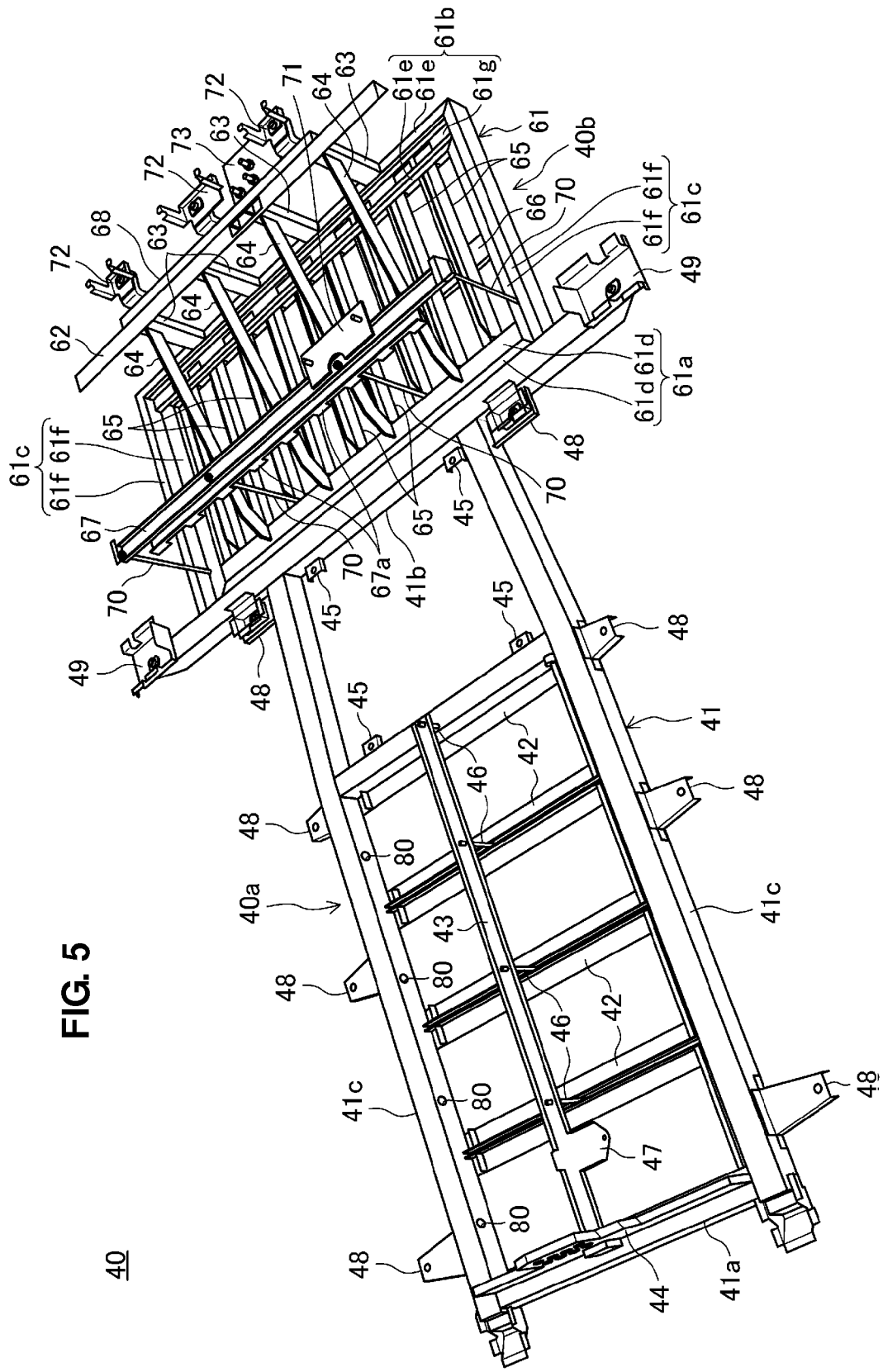
FIG. 5 is a perspective view showing a frame member of the battery unit.

FIG. 5 shows the above-described frame member 40. The frame member 40 comprises a first support portion 40a corresponding to the first mount portion 21a and a second support portion 40b corresponding to the second mount portion 21b. The first support portion 40a supports the plural battery modules 22 on the first mount portion 21a (the battery modules 22 included in the first battery module group) and the tray 28 of the electric-component installment portion 27. The second support portion 40b supports the plural battery modules 22 on the second mount portion 21b (the battery modules 22 included in the second battery module group).

The plural battery modules 22 on the first mount portion 21a and the plural battery modules 22 on the second mount portion 21b are arranged longitudinally away from each other with the electric-component installment portion 27 located between them in a plan view. The first and second support portions 40a, 40b support the battery modules 22 at the above-described positions away from each other.

The first support portion 40a has a frame portion 41 with a front portion 41a, a rear portion 41b, and a pair of side portions 41c. The front portion 41a of the frame portion 41 extends in the vehicle width direction, and its both end portions are respectively connected to front end portions of the side portions 41c which extend longitudinally. The rear portion 41b of the frame portion 41 extends outward beyond the side portions 41c, and the side portions 41c connect to a middle portion of the rear portion 41b. At the front portion 41a of the frame portion 41 is provided the inverter-connection terminal support portion 44 to support the inverter-connection terminal 31. The front portion 41a, rear portion 41b, and side portions 41c of the frame portion 41 are formed, respectively, in a hollow shape having the rectangular section. The respective insides of the front portion 41a, the rear portion 41b, and the side portions 41c are connected to each other, so that the frame portion 41 has a continuously-connected inside over its entire periphery.

Further, the first support portion 40a further has four middle frame portions 42 which interconnect the both side portions 41c at four middle positions of the both side portions 41c of the frame portion 41. The four middle frame portions 42 and the front portion 41a of the frame portion 41 support lower portions of the outside end portions of the four battery modules 22 on the first mount portion 21a. The rearmost middle frame portion 42 supports the rearmost battery module 22 and the above-described tray 28 together with the rear portion 41b of the frame portion 41. That is, the tray 28 is supported at tray support portions 45 which are respectively provided at the rearmost middle frame portion 42 and the rear portion 41b. The other three middle frame portions 42 are located between the adjacent battery modules 22, and support lower portions of the outside end portions of the respective battery modules 22 and also specify setting positions of the respective battery modules 22.

The first support portion 40a further includes an upper frame portion 43 which extends longitudinally at the center between the both side portions 41c of the frame portion 41 and supports an upper portion of the battery modules 22 on the first mount portion 21a. The upper frame portion 43 is supported at the middle frame portion 42 via poles 46, and its front end is supported at the above-described inverter-connection terminal support portion 44. At a frontal position of the upper frame portion 43 is provided a connection-terminal support portion 47 to support a connection terminal 33 to which harnesses from the inverter-connection terminal 31 are coupled.

Four fixing portions 48 to be fixed to the right and left front floor frames 7 are provided at outside faces of the side portions 41c of the frame portion 41. The foremost two fixing portions 48 are fixed to connection portions between the front floor frames 7 and the front side frames 8. The rearmost fixing portions 48 are joined to the rear portion 41b of the frame portion 41 as well. Since the fixing portions 48 are fixed to the both-side front floor frames 7, the first mount portion 21a (the first support portion 40a) are supported at the both-side front floor frames 7.

A pair of fixing portions 49 to be fixed to front end portions (connection portions to the side sills) of the rear side frames 9 is provided at both end portions of the rear portion 41b of the frame portion 41. The rear portion 41b of the frame portion 41 is integrally connected to a front portion 61a of the lower frame portion 61, which will be specifically described later, at the second support portion 40b. Accordingly, the fixing portions 49 are fixed to the both-side rear side frames 9, so that the second mount portion 21b (the second support portion 40b) is supported at the rear side frames 9.

Figure 6:
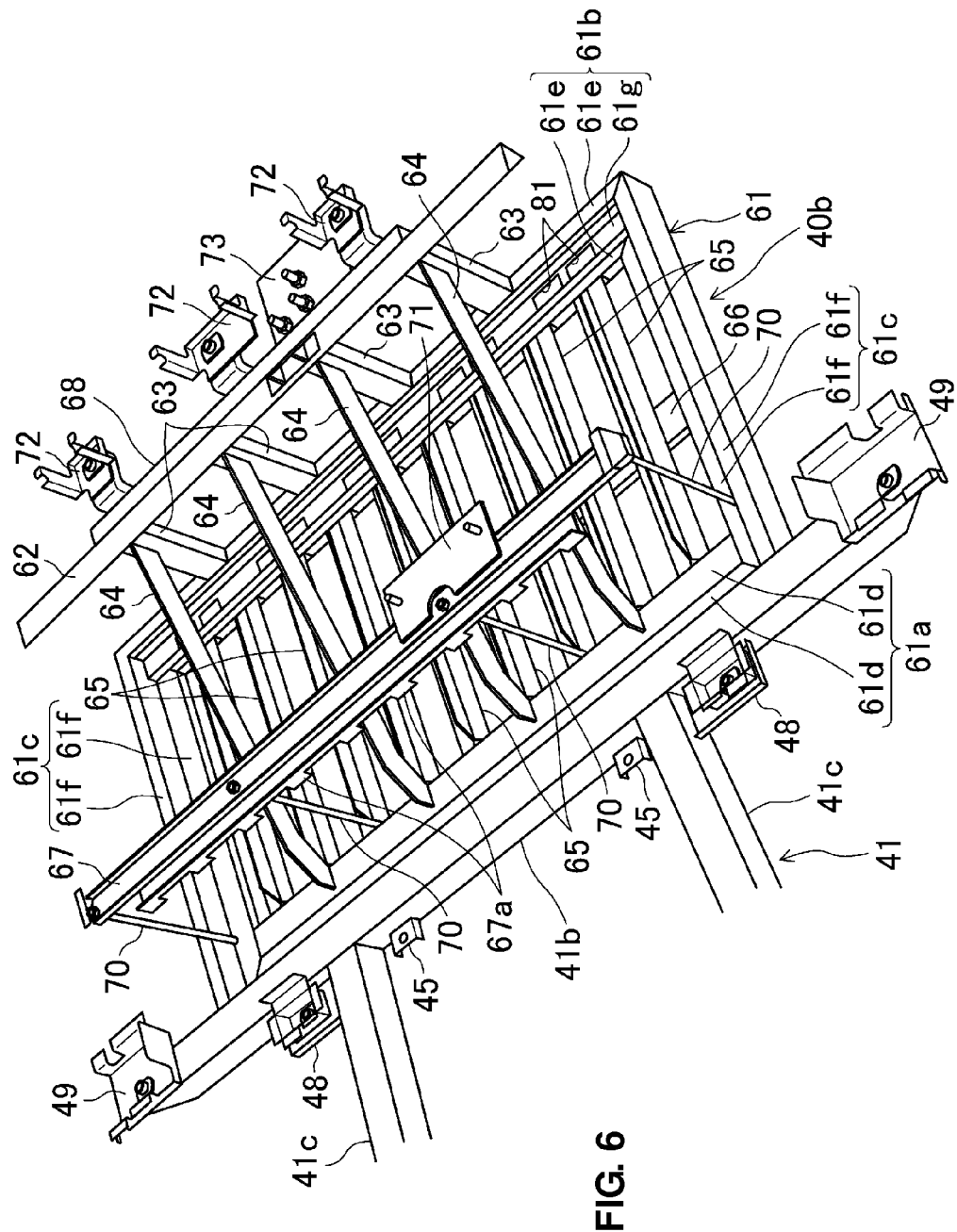
FIG. 6 is an enlarged perspective view showing a second support portion of the frame member.

As shown in FIGS. 5 and 6, the second support portion 40b has a frame member 61 which includes a front portion 61a which extends in the vehicle width direction and supports lower portions of front end portions of the plural battery modules 22, a rear portion 61b which extends in the vehicle width direction and supports lower portions of rear end portions of the plural battery modules 22, and a pair of side portions 61c which interconnects both side end portions of the front and rear portions 61a, 61b and supports lower portions of outside end portions of the two battery modules 22 located on both side ends in the vehicle width direction. The distance between the both side portions 61c is greater than that between the both side portions 41c of the frame portion 41 at the first mount portion 21a of the frame member 40. That is, the distance between the both side portions 41c of the frame portion 41 is smaller than that between the both side portions 61c of the lower frame portion 61, and the both side portions 61c of the lower frame portion 61 are located outward from the both side portions 41c of the frame portion 41.

The front portion 61a of the lower frame portion 61 is comprised of two hollow members 61d having a rectangular section which are vertically located in piles. The short side of the rectangular section of the two members 61d extends in the vertical direction. The rear portion 61b of the lower frame portion 61 is comprised of two hollow members 61e having a rectangular section which are vertically located in piles. Herein, while the short side of the rectangular section of the frame inside (front) member 61e extends in the vertical direction, the long side of the rectangular section of the frame outside (rear) member 61e extends in the vertical direction. Further, each of the side portions 61c of the lower frame portion 61 is comprised of two hollow members 61f having a rectangular section which are laterally located in piles. While the short side of the rectangular section of the frame inside (vehicle inside) member 61f extends in the vertical direction, the long side of the rectangular section of the frame outside (vehicle outside) member 61f extends in the vertical direction.

A member having a reverse-L shaped section 61g is fixed to a corner portion formed by the frame inside member 61e and the frame outside member 61e of the rear portion 61b. A space is formed between the member 61g and the two members 61e. This space connects to the inside of the frame outside member 61e (see FIG. 12). The inside of the frame outside members 61e connects to the inside of the frame outside members 61f of the both side portions 61c at the both-side end portions of the rear portion 61b. The inside of the frame outside member 61f of the side portion 61c connects to the inside of the rear portion 41b of the frame portion 41 of the first support portion 40a at the front end portion of the side portion 61c (see FIG. 9). Thus, the first and second support portions 40a, 40b are connected such that the both insides of these portions are interconnected.

The second support portion 40b further comprises a rear upper frame portion 62 which supports upper portions of rear end portions of the plural battery modules, hollow connection frame portions 63 which connect the rear upper frame portion 62 and the rear portion 61b of the lower frame portion 61, and slant frame portions 64 which slat forward and downward and connect upper portions of the connection portions 63 and the front portion 61a of the lower frame portion 61, middle frame portions 65 which connect the front portion 61a and the rear portion 61b of the lower frame portion 61, a central portion 66 which interconnects respective central portions of the both side portions 61c of the lower frame portion 61, and a front upper frame portion 67 which supports upper portions of front end portions of the plural battery modules.

The middle frame portions 65 (nine in total) are located between the adjacent battery modules 22 and support respective lower portions of thick-direction end portions of the battery modules 22, and also specify setting positions of the respective battery modules 22. Respective central portions of the middle frame portions 65 are supported at the central portion 66.

The above-described front upper frame portion 67 which extends in the vehicle width direction is supported at front end portions of the third and seventh middle frame portions 65 and the both side portions 61c of the lower frame portion 61 via some poles 70. At a front end of the front upper frame portion 67 are formed nine engagement portions 67a which engage with upper portions of front end faces of the battery modules 22 on the second mount portion 21b. Each of the engagement portions 67a engages with the upper portions of the front end faces of the two adjacent battery modules 22. Further, at the front upper portion 67 is provided a plug receiver support portion 71 to support the plug receiver 35 (see FIG. 4) into which the above-described safety plug is plugged.

Figure 7:
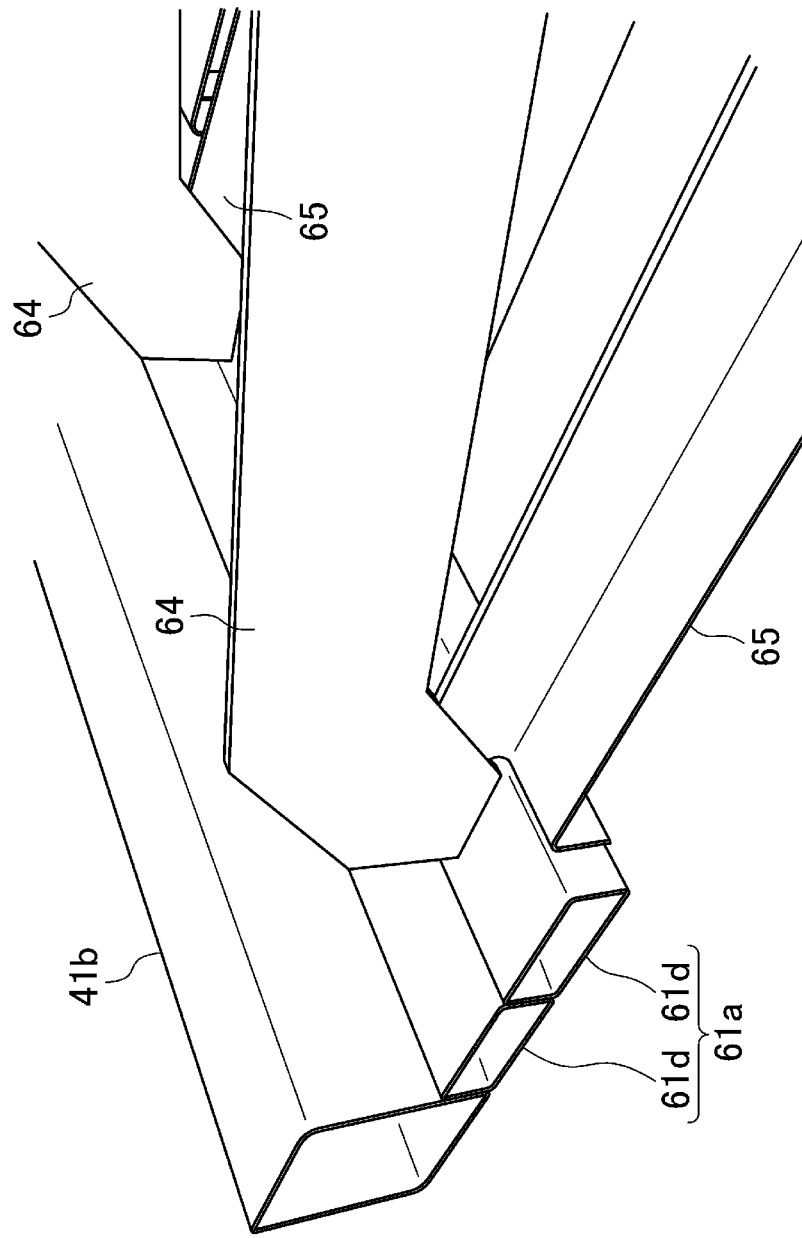
FIG. 7 is an enlarged perspective view showing front end portions of a slant frame portion and a middle frame portion.

The plural (four in the present embodiment) connection frame portions 63 and slant frame portions 64 are located with specific distances in the vehicle width direction. The four slant frame portions 64 are positioned between the second one and the third one of the battery modules 22, between the fourth one and the fifth one of the battery modules 22, between the sixth one and the seventh one of the battery modules 22, and between the eighth one and the ninth one of the battery modules 22, respectively. The leftmost connection frame portion 63 and slant frame portion 64 are located at the same position as the second middle frame portion 65 in the vehicle width direction, and the second, third and fourth (rightmost) connection frame portions 63 and slant frame portions 64 are respectively located at the same positions as the fourth, sixth and eighth middle frame portions 65 in the vehicle width direction. Further, as shown in FIG. 7, a front end portion of the leftmost slant frame portion 64 is connected to the front portion 61a of the lower frame portion 61 and also connected to the front end portion of the second middle frame portion 65 (connected to the front portion 61a of the lower frame portion 61). Likewise, the front end portions of the second, third and fourth (rightmost) slant frame portions 64 are respectively connected to the front end portions of the fourth, sixth and eighth middle frame portions 65. That is, the respective slant frame portions 64 are integral with the middle frame portions 65 which are located at the same as these portions 64 in the vehicle width direction. Herein, the rear end portions of the slant frame portions 64 may be connected to respective portions of the rear upper frame portion 62 which are located at the same positions as the slant frame portions 64 in the vehicle width direction, instead of the upper portions of the connection frame portions 63.

The leftmost slant frame portion 64 (and the leftmost connection frame portion 63) is located at the same position as the left side portion 41c of the frame portion 41 of the frame member 40 on the first mount portion 21a in the vehicle width direction, and the rightmost slant frame portion 64 (and the rightmost connection frame portion 63) is located at the same position as the right side portion 41c of the frame portion 41 of the frame member 40 in the vehicle width direction.

The above-described rear upper frame portion 62 has a reverse-L shaped section and triangular both end faces. At a rear face of the rear upper frame portion 62 is provided the hollow reinforcement frame portion 68 which extends in the vehicle width direction over between the leftmost connection frame portion 63 and the rightmost connection frame portion 63. This reinforcement frame portion 68 can be considered as part of the rear upper frame portion 62. The upper end portions of the connection frame portions 63 are connected to the reinforcement portion 68. The upper end portions of the leftmost connection frame portion 63 and the rightmost connection frame portion 63 are respectively connected to the both outside end portions of the reinforcement frame portion 68 and specified portions of the rear face of the rear upper frame portion 62 where the reinforcement portion 68 does not exist. The second and third connection frame portions 63 are connected to the lower face of the reinforcement frame portion 68.

The reinforcement frame portion 68 projects outside the battery unit 21 through the air outlet port 38 formed at the rear end portion of the upper cover member 23. At the rear face of the reinforcement frame portion 68 are provided three fixing portions 72 to be fixed to the above-described cross member 10 and the above-described electric-power input terminal support portion 73 to support the electric-power input terminal 32. The fixing portions 72 are fixed to the cross member 10 and the fixing portions 49 are fixed to the rear side frames 9, so that the second mount portion 21b (the second support portion 40b) is supported at the rear side frames 9 via the cross member 10 and the rear portion 41b of the frame portion 41 of the first support portion 40a. Further, through the fixing of the fixing portions 48 to the front floor frames 7, the fixing of the fixing portions 49 to the rear side frames 9, and the fixing of the fixing portions 72 to the cross member 10, the battery unit 21 is supported at the front floor frames 7 and the rear side frames 9 as a vehicle body frame, so that the support of the battery unit 21 can be improved.

The inside of the above-described connection frame portion 63 connects to the inside the frame outside member 61e of the rear portion 61b of the lower frame portion 61 at its lower end portion, and connects to the inside of the reinforcement frame portion 68 at its upper end portion (see FIG. 12).

When the vehicle equipped with the above-described battery unit 21 has the rear collision, the second mount portion 21b receives an impact force of the collision from the spare tire pan 3a. Herein, the second mount portion 21b having the above-described structure may not deform easily even when receiving the impact force. In particular, since there are provided the plural (four in the present embodiment) slant frame portions 64 interconnecting the upper portions of the connection frame portions 63 and the front portion 61a of the lower frame portion 61, and the two of the slant frame portions 64 (the leftmost and rightmost slant frame portions 64, 64) are respectively located at the same positions as the both side portions 41c of the frame portion 41 of the first support portion 40a of the first mount portion 21a in the vehicle width direction, the deformation of the second support portion 40b of the second mount portion 21b can be prevented more effectively by using the first support portion 40a of the first mount portion 21a. Further, the slant frame portions 64 being integral with the middle frame portions 65 can also contribute to preventing the deformation of the second support portion 40b of the second mount portion 21b.

According to the present embodiment described above, the battery unit 21 comprises the plural battery modules 22, each of which has the substantially the same flat shape having the rectangular section along its longitudinal direction, the battery unit 21 being mounted below the vehicle floor 1 which includes the front floor portion 1a and the rear floor portion 1b located above the level of the front floor portion 1a, the battery modules 22 mounted on the first mount portion 21a located below the front floor portion 1a are arranged in the vehicle longitudinal direction such that the longitudinal direction of each of the battery modules 22 matches the vehicle width direction and the short side of the rectangular section of each of the battery modules 22 extends in the vehicle vertical direction because the sufficient height of space for mounting the batter modules 22 may not be provided. Meanwhile, the battery modules 22 mounted on the second mount portion 21b are arranged in the vehicle width direction such that the longitudinal direction of each of the battery modules 22 matches the vehicle longitudinal direction and the long side of the rectangular section of each of the battery modules 22 extends in the vehicle vertical direction because the sufficient height of space for mounting the batter modules 22 may be provided. Accordingly, the plural battery modules 22 having the same shape can be efficiently arranged in accordance with the height of the mount space of the battery modules 22, so that as many battery modules 22 as possible can be amounted.

As shown in FIGS. 5, 9 and 10, an inlet port 80 to guide the gas discharged from the discharge port 22d formed at each battery module 22 into the frame member 40 is formed at the right side portion 41c of the frame portion 41 of the first support portion 40a at a position facing the discharge port 22d of the gas guide member 22c of each battery module 22 of the first mount portion 21*a*. Each inlet port 80 connects to each discharge port 22*d*. Accordingly, when it generates in the battery modules 22 (the module bodies 22*a*) of the first mount portion 21*a*, the gas is guided so as to flow down through the gas guide passage 22*f*, the discharge port 22*d*, and the inlet port 80, then into the right side portion 41*c* of the frame portion 41. The guided gas flows from the inside of the right side portion 41*c* to the rear portion 41*b* directly or passing through the insides of the front portion 41*a* and the left side portion 41*c*. Then, the gas flows through the insides of the outside member 61*f* at the left side portion 61*c* or the right side portion 61*c*, the outside member 61*e* at the rear portion 61*b*, and the connection frame portion 63, then into the inside of the reinforcement frame 68. Finally, it is exhausted from an outlet port 85 which will be described later. The front portion 41*a*, the rear portion 41*b*, and the both side portions 41*c* of the frame portion 41, the rear portion 61*b* and the both side portions 61*c* of the lower frame portion 61, the connection frame portions 63, and the reinforcement frame portion 68 correspond to a middle frame member in claim 8 of the present invention.

Figure 13:
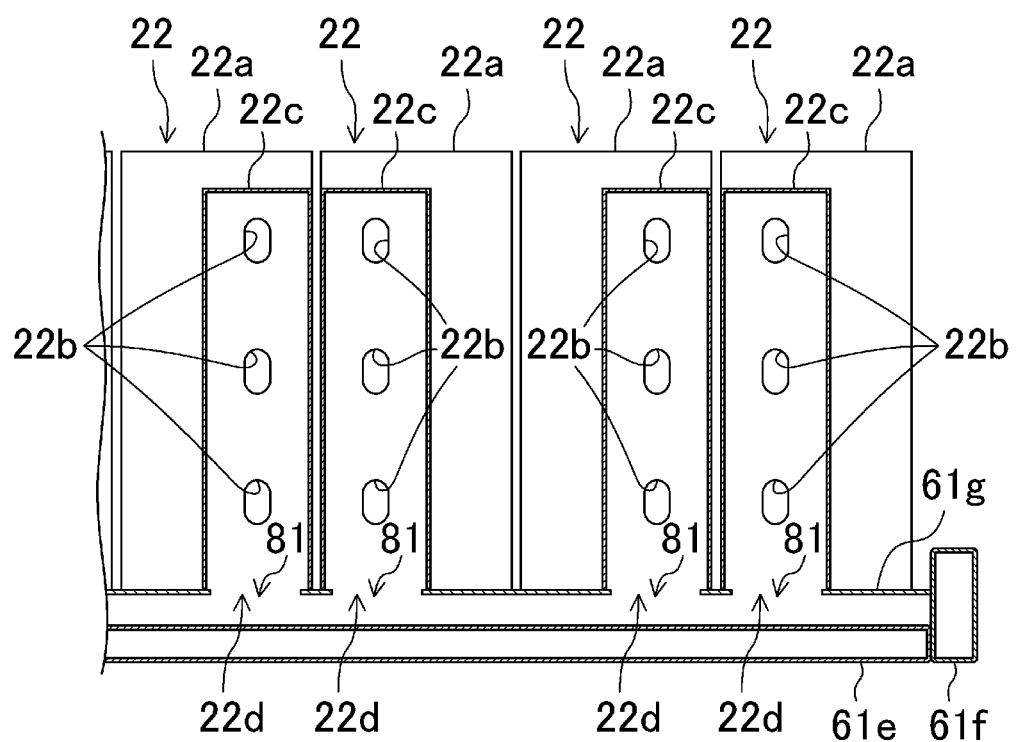
FIG. 13 is a sectional view taken along line XIII-XIII of FIG. 12.

As shown in FIGS. 6, 12 and 13, an inlet port 81 to guide the gas discharged from the discharge port 22*d* formed at each battery module 22 into the frame member 40 is formed at the member 61*g* of the rear portion 61*b* of the lower frame portion 61 of the second support portion 40*b* at a position facing the discharge port 22*d* of the gas guide member 22*c* of each battery module 22 of the second mount portion 21*b*. Each inlet port 81 connects to each discharge port 22*d*. Accordingly, when it generates in the battery modules 22 (the module bodies 22*a*) of the second mount portion 21*b*, the gas is guided so as to flow down through the gas guide passage 22*f*, the discharge port 22*d*, and the inlet port 81, then into a space among the member 61*g* of the rear portion 61*b* and the two members 61*e* of the lower frame portion 61. The guided gas flows through the inside of the outside member 61*e* and the inside of the connection frame portion 63, then into the inside of the reinforcement frame portion 68, and finally it is exhausted from the outlet port 85 which will be described later.

The outlet port 85 which exhausts the gas guided into the frame member 40 from the above-described inlet ports 80, 81 to the outside of the battery unit 21 is formed at the rear face (located on the outside of the battery unit 21) of the reinforcement frame portion 68 (see FIGS. 1 and 12). That is, the gas which is guided into the right side portions 41*c* of the frame portion 41 of the frame member 40 from the inlet port 80, or guided into the rear portion 61*b* of the lower frame portion 61 of the frame member 40 from the inlet port 81 is exhausted to the outside of the battery unit 21 via the outlet port 85.

The above-described outlet port 85 is common to the first and second support portions 40*a*, 40*b*. That is, the outlet port 85 is located at another portion than the frame portion 41 (having the connected inside over its entire periphery) of the frame member 40. Thereby, the gas can be guided into the outlet port 85, being cooled by its flowing inside the frame portion 41. In particular, the front face of the front portion 41*a* and the outside face of the both side portions 41*c* of the frame portion 41 are exposed to the outside air, so that the gas cooling can be increased. Further, while the electric-component installment portion 27 at the first support portion 40*a* is arranged between the battery module group at the first mount portion 21*a* and the battery module group at the second mount portion 21*b*, the gas flows inside the both side portions 41*c* positioned on the outside of the electric-component installment portion 27, so that any electric component at the electric-component installment portion 27 may not be damaged by the gas.

Further, since the outside faces of the both side portions 61*c* and the rear face of the rear portion 61*b* of the lower frame portion 61 at the second support portion 21*b* are also exposed to the outside air, the gas is cooled and exhausted from the outlet port 85. While it is preferable that the outlet port 85 be formed at a position where the gas can be cooled and then exhausted, the outlet port 85 may be located at any position if the high-temperature gas exhausted may not cause any problem, and it may be formed at the first support portion 40*a*. Also, this outlet port 85 may be at each of the first and second support portions 40*a*, 40*b*. In case the outlet port 85 is formed at any face of the frame member 40 which is exposed to the outside air, the gas can be easily exhausted to the outside of the battery unit 21. It may be preferable that the position of the outlet port 85 be above the battery unit 21 (near the vehicle floor 1). Thereby, any water, such as rain drops, may not easily come into through the outlet port 85, so that any particular means for preventing the water from coming in may not be provided.

According to the present embodiment described above, since the gas generating inside the battery modules 22 is guided into the inside of the hollow frame member (the front portion 41*a*, the rear portion 41*b*, and the both side portions 41*c* of the frame portion 41; the rear portion 61*b* and the both side portions 61*c* of the lower frame portion 61, the connection frame portions 63, and the reinforcement frame portion 68), and the gas guided in is exhausted to the outside of the battery unit 21 from the outlet port 85. Accordingly, the efficient gas exhaustion to the outside of the battery unit 21 can be achieved without providing any particular gas exhaust pipe.

The present invention should not be limited to the above-described embodiment, and any other modifications and improvements may be applied within the scope of a spirit of the present invention.

For example, while the first mount portion 12*a* has the electric-component installment portion 27 in the present embodiment, the battery modules 22 may be mounted at the position of the electric-component installment portion 27. In this case, however, there is a possibility that the level of the foot place 1*d* of the passenger seated in the rear seat may be higher.

While the plural battery modules 22 are formed as a unit with the frame member 40 in the present embodiment, any tray may be used in place of the frame member 40 for forming the battery modules 22 as a unit.

Further, while the arrangement manners of the battery modules 22 are different from each other between the first mount portion 40*a* and the second mount portion 40*b* in the present embodiment, all of the battery modules 22 may be arranged in the same manner. Moreover, the battery modules 22 having the module bodies 22*a*, shapes of which are different from each other, may be provided. In particular, since the second mount portion 40*b* has a large mount space for the battery modules 22, the large-sized battery modules 22 can be mounted.

What is claimed is:

1. A battery mounting structure of an electromotive vehicle, comprising:
   a vehicle floor comprising a front floor portion and a rear floor portion which is located above the front floor portion; and
   a battery unit comprising plural battery modules and a battery mount portion on which the plural battery modules are mounted, each of the plural battery modules having substantially the same flat shape having a rectangular section along a longitudinal direction thereof, the battery unit being mounted below the vehicle floor, wherein said battery mount portion of the battery unit comprises a first mount portion which is positioned below said front floor portion of the vehicle floor and a second mount portion which is continuous from the first mount portion and positioned below said rear floor portion of the vehicle floor, and the battery modules mounted on the first mount portion are arranged at least in a vehicle longitudinal direction such that the longitudinal direction of each of the battery modules matches a vehicle width direction and the short side of said rectangular section of each of the battery modules extends in the vehicle vertical direction, and the battery modules mounted on the second mount portion are arranged in the vehicle width direction such that the longitudinal direction of each of the battery modules matches the vehicle longitudinal direction and the long side of said rectangular section of each of the battery modules extends in the vehicle vertical direction.

2. The battery mounting structure of an electromotive vehicle of claim 1, wherein said first mount portion is supported at a pair of front floor frames fixed to a lower face of said front floor portion, and said second mount portion is supported at a pair of rear side frames fixed to a lower face of said rear floor portion, the distance between the pair of rear side frames being greater than that between the pair of front floor frames.

3. The battery mounting structure of an electromotive vehicle of claim 1, wherein said first mount portion has an electric-component installment portion to install an electric component, and the maximum height of the electric component installed at the electric-component installment portion of the first mount portion is located below an upper face of the battery modules mounted on the first mount portion.

4. The battery mounting structure of an electromotive vehicle of claim 3, wherein a rear seat is arranged on said rear floor portion, a rear portion of said front floor portion is located below the level of a front portion of the front floor portion, and said electric-component installment portion of the first mount portion is positioned below the rear portion of the front floor portion.

5. The battery mounting structure of an electromotive vehicle of claim 1, wherein said second mount portion includes a second support portion to support the plural battery modules, and said second support portion comprises:

a lower frame portion which includes a front portion to support lower portions of front end portions of the plural battery modules, a rear portion to support lower portions of rear end portions of the plural battery modules, and a pair of side portions to support lower portions of outside end portions of the two battery modules located on both side ends in the vehicle width direction;

an upper frame portion which supports upper portions of rear end portions of the plural battery modules;

a connection frame portion which connects said upper frame portion and a rear portion of said lower frame portion; and a slant frame portion which connects an upper portion of said connection portion or said upper frame portion and a front portion of said lower frame portion.

6. The battery mounting structure of an electromotive vehicle of claim 5, wherein said first mount portion includes a first support portion to support the plural battery modules, which includes a frame portion with a front portion, a rear portion, and a pair of side portions, a rear portion of said frame portion of the first support portion is connected to the front portion of said lower frame portion of the second support portion, the distance between the both side portions of said frame portion of the first support portion is smaller than that between the both side portions of said lower frame portion of the second support portion, said slant frame portion of the second support portion is comprised of plural portions which are arranged in the vehicle width direction with specified distances from each other, two of which are located at the same positions as the both side ends of said frame portion of the first support portion in the vehicle width direction.

7. The battery mounting structure of an electromotive vehicle of claim 5, wherein said second support portion further comprises a middle frame portion which connects the front portion and the rear portion of said lower frame portion at the same position as said slant portion in the vehicle width direction, and the slant portion is formed integrally with said middle frame portion which is positioned at the same position as the slant frame portion in the vehicle width direction.

8. The battery mounting structure of an electromotive vehicle of claim 1, wherein each of said battery modules has a discharge port to discharge gas generating in the battery module to the outside, and part of said first and second mount portions is comprised of a hollow frame member, which has an inlet port to guide the gas discharged from said discharge port of the battery module thereinto and an outlet port to exhaust the gas guided thereinto through the inlet port to the outside of said battery unit.

9. The battery mounting structure of an electromotive vehicle of claim 8, wherein said battery unit has an electric-component installment portion to install an electric component, said plural battery modules are arranged such that said electric-component installment portion is located between the battery modules in a plan view, said first and second mount portions respectively comprise first and second support portions to support the battery modules which are arranged away from each other, the first and second support portions are connected to each other such that the insides thereof connects to each other, and said outlet port is formed at either the first support portion or the second support portion to be common to the both.

10. The battery mounting structure of an electromotive vehicle of claim 8, wherein said first mount portion includes a frame portion which has a continuously-connected inside over an entire periphery thereof, and said outlet port is located at another frame portion which constitutes part of said second mount portion.

11. The battery mounting structure of an electromotive vehicle of claim 8, wherein each of said battery modules comprises a module body, an exhaust port which is provided at the module body to exhaust the gas generating in the module body to the outside of the module body, and a gas guide member which is provided at an outside face of the module body, has said discharge port, and guides the gas exhausted from said exhaust port to the discharge port, each of said module bodies of the plural battery modules has the same shape in which said gas guide member is provided at the same face, the plural battery modules are included in either one of first and second battery module groups in which manners of arrangement of the battery modules are different from each other, each of the gas guide members of the battery modules of the first and second battery module groups has substantially the same shape except said discharge port and the vicinity of the discharge port, the discharge port of each of the gas guide members of the battery modules of the first and second battery module groups is formed at a specified portion so as to correspond to the manners of arrangement of the battery modules, and said inlet port is formed at a position facing said discharge port such that the inlet port connects to the discharge port.

12. The battery mounting structure of an electromotive vehicle of claim 8, wherein part of an outside face of a frame member which constitutes part of said first and second mount portions is exposed to the outside air.

13. The battery mounting structure of an electromotive vehicle of claim 8, wherein said battery unit comprises a cooling structure in which the outside air is taken in inside the battery unit and discharges the taken-in outside air to the outside through a space between the battery modules and a cover member enclosing the battery modules.

* * * * *